United States Patent [19]

Numazawa et al.

[11] 4,403,526
[45] Sep. 13, 1983

[54] MANUAL TRANSMISSION AND HYDRAULICALLY OPERATED SUBTRANSMISSION

[75] Inventors: Akio Numazawa, Nagoya; Hajime Arai, Aichi, both of Japan

[73] Assignee: Mobil Oil Corporation, New York, N.Y.

[21] Appl. No.: 166,906

[22] Filed: Jul. 8, 1980

[30] Foreign Application Priority Data

Sep. 25, 1979 [JP] Japan ................................ 54-123503

[51] Int. Cl.³ .......................... F16H 37/00; F16H 3/44
[52] U.S. Cl. .................................... 74/740; 74/781 R; 192/18 R
[58] Field of Search .................... 74/745, 740, 781 R, 74/784; 192/12 R, 18 R, 17 R

[56] References Cited

U.S. PATENT DOCUMENTS

| 2,349,410 | 5/1944 | De Normanville | 74/781 R |
| 3,164,036 | 1/1965 | Lamburn et al. | 74/781 R |
| 3,182,528 | 5/1965 | Lamburn | 74/781 R |
| 3,295,394 | 1/1967 | Whateley | 74/781 R |
| 3,382,736 | 5/1968 | Abbott | 74/781 R |

FOREIGN PATENT DOCUMENTS

| 103958 | 5/1938 | Australia | 74/781 R |
| 166648 | 4/1954 | Australia | 74/781 R |
| 212124 | 7/1957 | Australia | 74/781 R |
| 703737 | 2/1965 | Canada | 74/781 R |
| 721499 | 11/1965 | Canada | 74/781 R |
| 1071897 | 2/1980 | Canada | 74/740 |
| 25823 | 1/1981 | European Pat. Off. | 74/740 |
| 28579 | 5/1981 | European Pat. Off. | 74/745 |
| 24454 | 11/1981 | European Pat. Off. | 74/740 |
| 1115237 | 12/1954 | France | 74/740 |
| 456007 | 11/1936 | United Kingdom | 74/781 R |
| 947948 | 1/1964 | United Kingdom | 74/781 R |
| 991434 | 5/1965 | United Kingdom | 74/781 R |

OTHER PUBLICATIONS

Automobile Engineer, Feb., 1963, pp. 58-60, "De Normanville Pre-Gearbox Overdrives".

Primary Examiner—Rodney H. Bonck
Assistant Examiner—Lawrence J. Gotts
Attorney, Agent, or Firm—Alexander J. McKillop; Michael G. Gilman; Howard M. Flournoy

[57] ABSTRACT

A transmission for an automotive vehicle, including an auxiliary speed change device of a planetary gear mechanism type, which provides two speed stages and is automatically shifted between the two speed stages by a hydraulic fluid control system according to the operational conditions of the vehicle, and a main speed change device which is connected in series to the auxiliary speed change device, and which includes a gear transmission mechanism, which is manually shiftable between several speed stages.

4 Claims, 2 Drawing Figures

MANUAL TRANSMISSION AND HYDRAULICALLY OPERATED SUBTRANSMISSION

BACKGROUND OF THE INVENTION

The present invention relates to the field of automotive vehicle transmission devices, and more particularly relates to a manual transmission device providing a plurality of speed stages which is coupled to a hydraulically operated auxiliary transmission comprising a planetary gear mechanism and providing two speed stages.

A transmission device for an automotive vehicle such as an automobile, which is a combination of a main speed change device in the form of a conventional manually controlled gear transmission device which provides a plurality of forward speed stages and a reverse stage, and an auxiliary speed change device which provides two alternative transmission speed ratios, i.e. a low speed ratio and a high speed ratio, has already been proposed. Such an auxiliary speed change device is switched between its low speed stage and its high speed stage according to the overall general driving conditions in which the automotive vehicle is being operated, while on the other hand the main speed change device is switched between its various forward speed stages and its reverse stage in response to the moment by moment driving conditions in which the automotive vehicle is being operated.

For example, when the automotive vehicle is being operated in town traffic, or in a hilly area, the auxiliary speed change device is set to its low speed stage, and the main speed change device is used to provide the particular gearing ratio required, moment by moment, according to the speed of the vehicle and the acceleration required therefor. Thus, with the auxiliary speed change device in its aforesaid low speed stage, the transmission device provides a range of forward vehicle speed stages which provide, as a whole, relatively high reduction gear ratios, and which are therefore well suited for such city traffic driving, or driving in hilly country. Accordingly, in this mode of operation, because a more appropriate range of transmission gear ratios is available for these driving conditions, the performance and drivability of the vehicle are maximized, and the fuel consumption thereof is also made to be as high as practicable.

On the other hand, when the automotive vehicle is being used on the open road, such as upon an expressway, the auxiliary speed change device is set to its high speed stage. With the auxiliary speed device remaining set in its high speed stage, the manual operation of the main speed change device will provide a range of forward vehicle speed stages which provide, as a whole, relatively low reduction gear ratios. Thus, both the driving characteristics of the vehicle in high speed driving, and also the fuel consumption of the vehicle in such driving, are improved. Further, because a lower overall reduction gear ratio is provided for such high speed driving, engine vibration and engine noise are reduced during these conditions, because engine rotational speed is, as a whole, lower.

It has been previously practiced to shift such an auxiliary speed change device manually by the driver between its low and its high speed stages. With such a system of operation, the driver of the automotive vehicle must use his judgement as to whether he is currently operating the vehicle in the sort of driving conditions which merit the use of the high reduction gear ratio of the auxiliary speed control device, or of the low reduction gear ratio thereof.

SUMMARY OF THE INVENTION

The present invention arises from the realization that a very substantial improvement in the overall operational characteristics, and in the fuel consumption, of an automotive vehicle may be realized by performing the switching operation of the auxiliary speed change device between its high speed stage and its low speed stage automatically by an automatic control device, in accordance with and based upon various vehicle operating parameters, such as, for example, the amount of opening of the intake throttle of the internal combustion engine of the vehicle, the vehicle speed, the temperature of the cooling water or the lubricating oil of the engine, the temperature of the exhaust gases of the engine, or the temperature of the catalyst in a catalytic convertor of the exhaust system of the vehicle.

From the above standpoint, and further in consideration of the fact that it is desirable for such an auxiliary speed change device to be as compact and as light in weight as possible, in order to minimize the size and the weight as a whole of the vehicle transmission which is formed by the combination of this auxiliary speed change device and the main speed change device, an object of the present invention is to provide a vehicle transmission incorporating a manually operated main speed change device which provides a plurality of speed stages and an auxiliary speed change device which provides two different gear ratios, wherein the structure of the auxiliary speed change device is particularly adapted to automatic switching operation by a fluid control device such as, for example, a hydraulic fluid pressure control circuit, and which is, further, suitable from the standpoint of providing a compact and a lightweight assembly as a whole.

A further object of the present invention is to provide such a transmission in which the auxiliary speed change device is formed as a planetary gear system, an actuator of which is hydraulically switched between two states, one of which provides the direct connection state of the planetary gear system, whereas the other of which provides a state of the planetary gear mechanism wherein it provides a certain rotational speed reduction ratio between its input shaft and its output shaft.

According to the present invention, these, and other, objects are accomplished by a transmission for an automotive vehicle, comprising: a transmission casing; a power input shaft; an auxiliary speed change device, comprising; a planetary gear mechanism, comprising a sun gear, a ring gear drivingly coupled to the power input shaft, a plurality of planetary pinions meshed between the sun gear and the ring gear, and a carrier rotatably supporting the planetary pinions; a friction engaging element coupled to the sun gear, which is selectively drivable between a first position wherein it connects the sun gear to the ring gear, and a second position where it connects the sun gear to the transmission casing; and a hydraulic actuator, a supply of hydraulic fluid pressure to which selectively propels said friction engaging element between said first and second positions; and a main speed change device, comprising; a power input member which receives the input of rotary power from said planetary carrier, a power output shaft, and a gear transmission mechanism which provides a plurality of reduction gear ratios between said power input member and said power output shaft, according to manual shift operation.

According to such a construction, while the main speed change device is manually shifted between a plurality of forward speed stages and a reverse stage by the driver of the vehicle, independently the auxiliary speed change device may be hydraulically shifted, as by an automatic hydraulic fluid pressure control circuit, between its high speed stage and its low speed stage, thus providing, in combination with the main speed change device, a most suitable range of speed stages for the particular driving conditions in which the vehicle is being used.

Further, according to the above detailed construction, the overall structure as a whole of the transmission is kept compact, light in weight, and also not extremely expensive to manufacture. Further, the amount of raw materials required for the manufacture of such a transmission, and the amount of energy required for its manufacture, are also kept within reasonable limits.

BRIEF DESCRIPTION OF THE DRAWINGS

The present invention will become more fully understood from the following description of a preferred embodiment thereof, which is to be taken in conjunction with the accompanying drawings. It should be clearly understood, however, that the description of the embodiment, and the drawings, are all of them provided purely for the purposes of illustration and exemplification only, and are in no way to be taken as limitative of the scope of the present invention. In the drawings, the same parts are designated by the same reference numerals in the two figures, and.

DESCRIPTION OF THE PREFERRED EMBODIMENT

Figure 1:
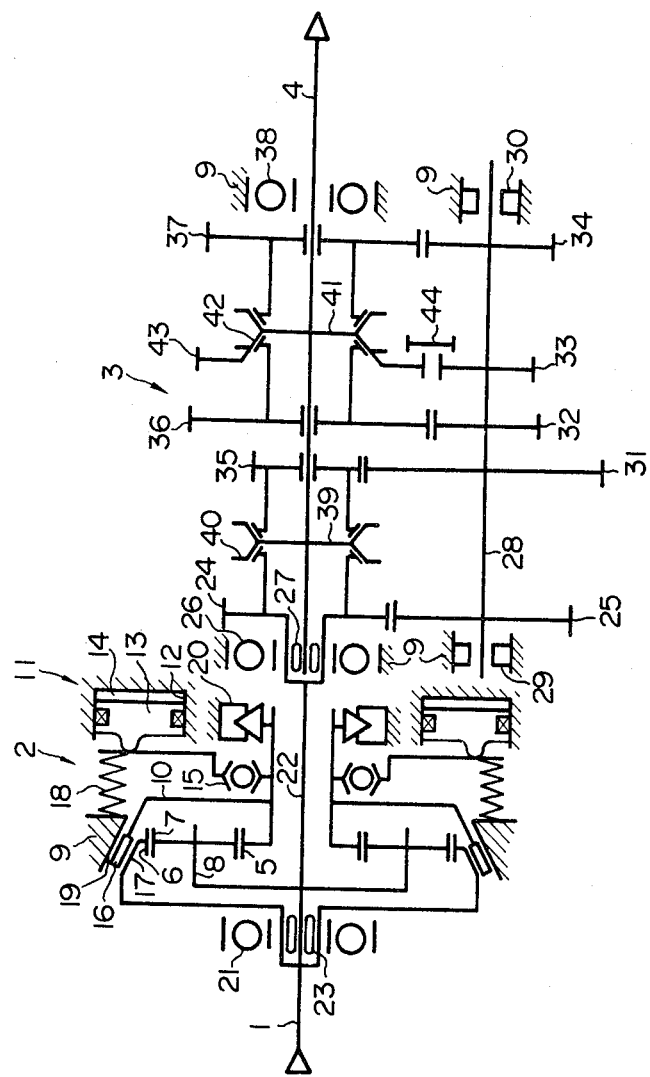
FIG. 1 is a schematic diagram showing the essential structure of a preferred embodiment of the automotive vehicle power transmission device according to the present invention.

The present invention will now be described in detail with respect to a preferred embodiment thereof, and with respect to the drawings.

In the drawing, the reference numeral 1 designates a power input shaft of the transmission, which is driven by an internal combustion engine, not shown in the drawings, of an automotive vehicle. The rotary power given to the input shaft 1 is transmitted through an auxiliary speed change device 2 and a main speed change device 3, while it is geared down in rotational speed by various ratios, and is connected via a power output shaft 4 to the road wheels of the automotive vehicles. As seen more clearly in FIG. 2, a casing of the auxiliary speed change device 2 and a casing of the main speed change device 3 are securely bolted together, and the combination of these casings is collectively designated as a transmission casing 9.

The auxiliary speed change device 2 comprises a planetary gear mechanism which comprises a sun gear 5, a ring gear 6, a plurality of planetary pinions 7 meshed between the sun gear 5 and the ring gear 6, and a carrier 8 which rotatably supports the planetary pinions, in a per se well known manner. The auxiliary speed change device 2 further comprises a two way friction engaging element 10 which is selectively movable between a first position in which it couples the sun gear 5 with the ring gear 6, and a second position in which it couples the sun gear 5 with the transmission casing 9. Further, the auxiliary speed change device 2 comprises a hydraulic actuator 11, and a selective supply of hydraulic fluid which selectively drives the two way friction engaging element 10 between its said first and second positions.

Figure 2:
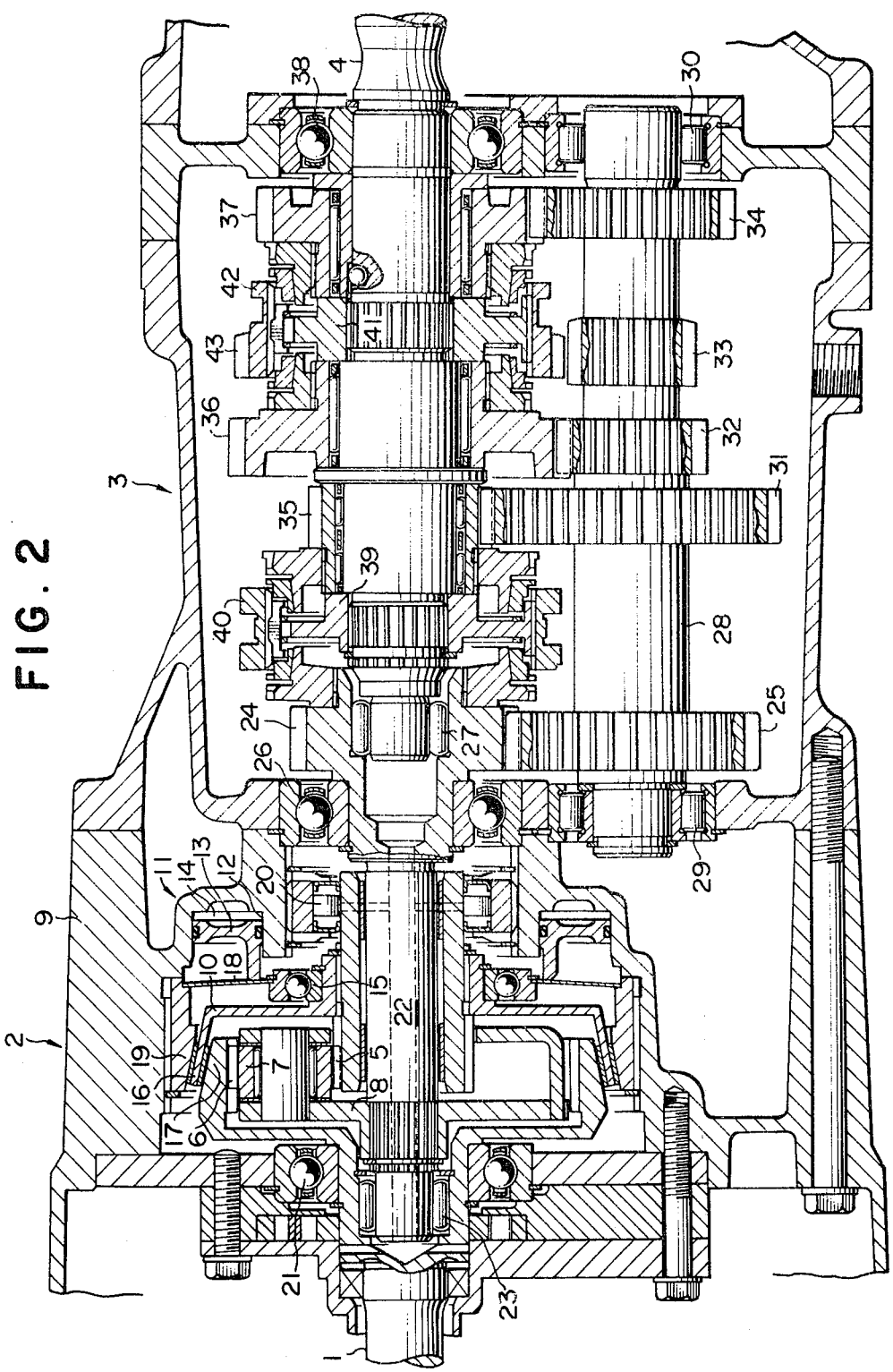
FIG. 2 is a vertical part sectional view taken through the automotive vehicle power transmission device shown in FIG. 1, and shows in a more concrete manner the structure of the various parts therein-this view is taken along a plane which includes the axis of the main shaft and the axis of the auxiliary shaft of the main speed change transmission device.

In more detail, the hydraulic actuator 11 comprises an annular chamber 12 and an annular piston member 13 which slides in the annular chamber 12 to the left and the right in FIG. 2. To the right hand side of the piston member 13 there is therefore defined an annular pressure chamber 14, between the annular piston member 13 and the transmission casing 9. Particularly in the embodiment shown in FIG. 2, the annular piston member 13 bears against the inner portion of an annular spring 18, the biasing action of which urges the annular piston member 13 in the right hand direction in the drawing, and the internal periphery of this annular spring 18 is secured to the outer race of a thrust bearing 15, the inner race of which is engaged over a hub portion of the two way friction engaging element 10. This hub portion of the two way friction engaging element 10 is engaged over a hollow shaft which extends axially to the right from the sun gear 5, and is splined thereto, so that the two way friction engaging element 10 is non-rotatably coupled to the sun gear 5.

Thus, when actuating hydraulic fluid pressure is supplied to the interior of the annular pressure chamber 14, via a conduit not shown in the drawings, this pressure impels the annular piston member 13 in the left hand direction in the drawing, against the biasing action of the annular plate spring 18, and this impels the inner periphery of the annular plate spring 18 to the left in the drawings, so as, via the thrust bearing 15, to urge the two way friction engaging element 10 to the left in the drawing into its said first position. The friction engaging element 10 has a conical engaging portion 16, and, in said first position, a friction element on the inner conical face of the conical engaging portion 16 is engaged with a corresponding outer conical engaging portion 17 formed on the ring gear 6, and accordingly, via the two way friction engaging element 10, the sun gear 5 and the ring gear 6 are rotationally coupled to one another. In this condition, the sun gear 5, the ring gear 6, the planetary pinions 7 and the carrier 8 all rotate together at the same rotational speed, and, accordingly, the auxiliary speed change device 2 is in its direct rotary power transmission state, providing a speed reduction ratio of one.

On the other hand, when actuating hydraulic fluid pressure is not supplied to the annular pressure chamber 14, then, by the biasing action of the spring 18, the piston member 13 is in the extreme right hand position in the drawing, so that, via the thrust bearing 15, the friction engaging element 10, which is, as described above, splined upon the hollow sun gear shaft, is moved to its rightwards or second position. In this position, a friction element mounted on the outer conical surface of the conical engaging portion 16 of the two way friction engaging element 10 is engaged to a corresponding inner conical engaging portion 19 of the transmission casing 9, and accordingly the two way friction engaging element 10 is rotationally coupled to the transmission casing 9 and is prevented from rotation. Thereby, the sun gear 5 is also prevented from rotation. In this condition, therefore, when the ring gear 6 rotates, the planetary pinions 7 perform planetary motion around the stationary sun gear 5, and the carrier 8 which carries the planetary pinions 7 rotates at a lower rotational speed than does the ring gear 6. In this condition, the auxiliary speed change device 2 is providing a certain amount of reduction gearing, i.e., it provides a reduction gear ratio greater than 1.

While the two way friction engaging element 10 is being switched between its first and second positions, the two way friction engaging element 10 is momentarily in the free state. To stop over-revving of the internal combustion engine of the automotive vehicle at this time, a one way clutch 20 is incorporated as mounted between the sun gear 5 and the transmission casing 9. The one-way clutch functions to prevent reverse rotation of sun gear member 5, that member having the lowest reaction load.

The power input shaft 1 is drivingly coupled to the ring gear 6 so as to rotate integrally therewith. The ring gear 6 is supported at its hub portion, by the transmission casing 9 via a bearing 21. The carrier 8, which rotatably supports the planetary pinions 7, is drivingly coupled to an intermediate shaft 22, which serves as a power output member for the auxiliary speed change device 2, and the left hand end in the figure of this intermediate shaft 22 is supported within a cavity in the hub portion of the ring gear 6, via an intermediate shaft support bearing 23.

Thereby, it is seen that the auxiliary speed change device 2 is constituted as a transmission device which provides either of two possible reduction gear ratios, and which is selected between these ratios by selective supply of hydraulic fluid pressure thereto. The arrangements for supplying this selective supply of hydraulic fluid pressure are not shown or discussed further here, because they are not relevant to the present invention.

Now the construction of the main speed change device 3 will be described in detail. The main speed change device 3 is of a type which provides four forward speed stages and one reverse stage, and which is manually controlled by the driver of the automotive vehicle. The rotary power transmitted from the carrier 8 of the auxiliary speed change device 2 through the intermediate shaft 22 is fed to a gear wheel 24, which is supported within the transmission casing 9 by a bearing 26. In a cavity formed in the central hub portion of the gear wheel 24, the left hand end of the power output shaft 4 is supported rotatably by a bearing 27. The right hand portion in the drawing of the power output shaft 4 is rotatably supported within the transmission casing 9 by a bearing 38. Thus, the power output shaft 4 is coaxial with the auxiliary speed change device 2.

Parallel to the central axis of the gear wheel 24 and of the power output shaft 4, and below it in the drawing, there is mounted an auxiliary shaft 28 which is rotatably supported within the transmission casing 9 by a first bearing 29 mounted at its left hand end and a second bearing 30 mounted at its right hand end. On the auxiliary shaft 28 there are fixedly mounted gear wheels 25, 31, 32, 33, and 34, in the specified order from the left of the drawing to the right. The gear wheel 25 is constantly meshed with the gear wheel 24.

On the power output shaft 4 there are mounted so as to be freely rotatable gear wheels 35, 36, and 37, which are, respectively, in constant mesh with the gear wheels 31, 32, and 34, which are, as stated above, fixedly mounted on the auxiliary shaft 28. Further, between the gear wheels 24 and 35, there is mounted on the power output shaft 4 a synchromesh mechanism, which comprises a clutch hub 39 and a hub sleeve 40. This synchromesh mechanism is per se well known. When the hub sleeve 40 is in an intermediate position, the clutch hub 39 is not drivingly coupled with either the gear wheel 24 or the gear wheel 35; when the hub sleeve 40 is moved to its left hand position in the drawing from its intermediate position, the clutch hub 39 is drivingly engaged with the gear wheel 24; and, on the other hand, when the hub sleeve 40 is moved to its right hand position in the drawing from its intermediate position, the clutch hub 39 is drivingly coupled with the gear wheel 35. The clutch hub 39 is drivingly coupled to the power output shaft 4.

In a similar fashion, there is mounted between the gear wheels 37 and 36 a second synchromesh mechanism which includes a clutch hub 41 and a hub sleeve 42. In this case, also, when the hub sleeve 42 is in an intermediate position in the drawing, the clutch hub 41 is not drivingly coupled with either the gear wheel 36 or the gear wheel 37; when the hub sleeve 42 is moved to the left in the drawing from its intermediate position, the clutch hub 41 is drivingly coupled with the gear wheel 36; and, when the hub sleeve 42 is moved to the right in the drawing from its intermediate position, the clutch hub 41 is drivingly coupled with the gear wheel 37. The clutch hub 41 is rotationally coupled to the power output shaft 4 so as to rotate integrally therewith.

Further, a set of reverse grear teeth 43 is formed on the outside of the hub sleeve 42, and, by the selective engagement of a reverse intermediate gear wheel 44 between the set of reverse gear teeth 43 and the gear wheel 33 mounted on the auxiliary shaft 28, reverse gear operation of the main speed change device 3 may be obtained. The reverse intermediate gear wheel 44 is not shown in FIG. 2, because it lies out of the sectional plane along which that figure is taken.

The operation of this main speed change device 3 is as follows. The synchromesh mechanism hub sleeves 40 and 42 are both shiftable to the left and the right in the drawing, selectively, by selector forks not shown in the drawing which are moved by a gear lever or the like operated manually by the driver of the automotive vehicle.

As will be clear from the shown relative sizes of the various gear wheels, when the synchromesh mechanism hub sleeve 42 is moved to the left in the drawing from its intermediate position, while the synchromesh mechanism hub sleeve 40 is in its intermediate position, then the synchromesh mechanism clutch hub 41 is drivingly engaged with the gear wheel 36, and power transmission is obtained from the intermediate shaft 22 via the gear wheels 24 and 25, the auxiliary shaft 28, the gear wheels 32 and 36, the synchromesh mechanism hub sleeve 42, and the synchromesh mechanism clutch hub 41 to the power output shaft 4, and first speed stage is obtained.

When the synchromesh mechanism hub sleeve 42 is moved to the right in the drawing from its intermediate position, while the synchromesh mechanism hub sleeve 40 is in its intermediate position, then the synchromesh mechanism clutch hub 41 is drivingly engaged with the gear wheel 37, and rotary power transmission is available from the intermediate shaft 22 via the gear wheels 24 and 25, the auxiliary shaft 28, the gear wheels 34 and 37, the synchromesh mechanism hub sleeve 42, and the synchromesh mechanism clutch hub 41 to the power output shaft 4, and in this condition second speed stage 5 is obtained.

When the synchromesh mechanism hub sleeve 42 is in its intermediate position and the synchromesh mechanism hub sleeve 40 is moved to the left in the drawing from its intermediate position, the gear wheel 24 is drivingly engaged to the synchromesh mechamism clutch hub 39, and accordingly power transmission is available from the intermediate shaft 22 via the gear wheel 24, the synchromesh mechanism hub sleeve 40 and the synchromesh mechanism clutch hub 39 directly to the power output shaft 4 with no change of rotational speed occurring between the intermediate shaft 22 and the power output shaft 4, and accordingly the main speed change device 3 is in its directly connected stage or its third speed stage.

When, further, the synchromesh mechanism hub sleeve 42 is in its intermediate position, and the synchromesh mechanism hub sleeve 40 is moved to its right hand position in the drawing from its intermediate position, where it engages with the gear wheel 35, then rotary power transmission is available from the intermediate shaft 22 via the gear wheels 24 and 25, the auxiliary shaft 28, the gear wheels 31 and 35, the synchromesh mechanism hub sleeve 40 and the synchromesh mechanism clutch hub 39 to the power output shaft 4, and thereby the main speed change device 3 provides its fourth speed stage, which is an overdrive stage. This fourth speed stage is such that, even when the auxiliary speed change device 2 is set to its low speed operational condition, the operation of the auxiliary speed change device 2 and the main speed change device 3 taken together is such that the reduction gear ratio between the power input shaft 1 and the power output shaft 4 is smaller than 1; in other words, the transmission operates in an overdrive condition.

Finally, when the synchromesh mechanism hub sleeves 40 and 42 are both in their intermediate positions, and the reverse intermediate gear wheel 44 is moved so as to mesh with the gear wheel 33 and the set of reverse gear teeth 43, then rotary power transmission is available from the intermediate shaft 22 through the gear wheels 24 and 25, the auxiliary shaft 28, the gear wheel 33, the reverse intermediate gear wheel 44, the set of reverse gear teeth 43, the synchromesh mechanism hub sleeve 42, and the synchromesh mechanism clutch hub 41 to the power output shaft 4. Thereby the main speed change device 3 provides its reverse stage.

Thereby it is seen, as a whole, the main speed change device 3 provides a plurality of manually selectable gear ratios, independently of the hydraulically selectable gear ratio provided by the auxiliary speed change device 2.

As may be seen from FIG. 2, the vehicle power transmission device provided according to the present invention is very compact and convenient to manufacture, and uses a relatively small quantity of raw materials and energy to fabricate, and is light in weight, robust, and durable.

Although the prevent invention has been shown and described in terms of a preferred embodiment thereof, and in language more or less specific with regard to structural features thereof, and with reference to the illustrative drawings, it should be understood that various changes, modifications, and omissions of the form and the detail thereof could be made by a person skilled in the art, without departing from the essential scope of the invention.

We claim:
1. A transmission for an automotive vehicle, comprising:
    (a) a transmission casing;
    (b) a power input shaft;
    (c) an auxiliary speed change device, comprising:
        (c1) a planetary gear mechanism, comprising a sun gear, a ring gear having hollow hub portion and drivingly coupled to the power input shaft, a plurality of planetary pinions meshed between the sun gear and the ring gear, and a carrier having an internally splined hollow hub portion and rotatably supporting the planetary pinions, said ring gear being rotatably supported at the outside of said hollow hub portion from said transmission casing;
        (c2) an annular friction engaging element coupled to the sun gear, which is selectively drivable between a first position wherein it connects the sun gear to the ring gear, and a second position where it connects the sun gear to the transmission casing; and
        (c3) a hydraulic actuator, comprising an annular chamber, an annular piston fitted in said annular chamber, and an annular spring plate which engages with and biases said friction engaging element to said second position and which also engages with said annular piston to transmit therethrough driving power of said annular friction engaging element when said hydraulic actuator is energized, a supply of hydraulic fluid pressure to said annular chamber propelling said friction engaging element to said first position against the biasing force of said annular spring plate; and
    (d) a main speed change device, comprising:
        (d1) a power input member which receives input of rotary power from said planetary carrier, said power input member integrally having a first bearing portion which is rotatably supported from the inside of said hollow hub portion of said ring gear, a splined portion which is engaged with said internally splined hollow hub portion of said planetary carrier, a second bearing portion which rotatably supports said sun gear, a third bearing portion which is rotatably supported from said transmission casing, and a gear portion, in said order from one end toward the other end thereof in a manner steppedly to increase diameters thereof;
        (d2) a power output shaft; and
        (d3) a gear transmission mechanism which includes said gear portion of said power input member as a power input gear thereof and provides a plurality of reduction gear ratios between said power input member and said power output shaft, according to manual shift operation.

2. A transmission according to claim 1, wherein the friction engaging element comprises a hollow conical assembly having outer and inner conical friction engaging surfaces, wherein the transmission casing is formed with an inner conical friction engaging surface which engages with said outer friction engaging surface when the friction engaging element is positioned in its second position, and wherein further the ring gear is formed with an outer conical friction engaging surface which engages with said inner friction engaging surface when the friction engaging element is positioned in its first position.

3. A transmission according to claim 2, wherein the friction engaging element and the hydraulic actuator are located between the planetary gear mechanism and the main speed change device.

4. A transmission according to claim 1, wherein the hydraulic actuator further comprises a thrust bearing having outer and inner race members, the outer peripheral portion of said annular spring plate being connected to the transmission casing while the inner peripheral portion of said annular spring plate is connected to the outer race of said thrust bearing, wherein the inner race of said thrust bearing is connected to said friction engaging element, said annular spring plate exerting a force on said outer race so as to drive the friction engaging element towards said second position, and wherein said annular piston drives the inner peripheral portion of said annular spring plate against said spring force, when it is actuated by hydraulic pressure.

* * * * *

UNITED STATES PATENT AND TRADEMARK OFFICE
CERTIFICATE OF CORRECTION

PATENT NO. : 4,403,526

DATED : September 13, 1983

INVENTOR(S) : Akio Numazawa and Hajime Arai

It is certified that error appears in the above-identified patent and that said Letters Patent are hereby corrected as shown below:

Item [73] ASSIGNEE: delete "Mobil Oil Corporation, New York, N.Y." and insert

-- Toyota Jidosha Kogyo Kabushiki Kaisha Aichi-ken, Japan --.

ATTORNEY, AGENT, OR FIRM: delete "Alexander J. McKillop; Michael G. Gilman; Howard M. Flournoy" and insert -- STEVENS, DAVIS, MILLER & MOSHER --.

Signed and Sealed this

Eighth Day of May 1984

[SEAL]

Attest:

GERALD J. MOSSINGHOFF

Attesting Officer

Commissioner of Patents and Trademarks